Aug. 18, 1936.    L. C. GALLEHER    2,051,137
HYDRAULIC VALVE
Filed July 17, 1933    4 Sheets-Sheet 1

INVENTOR
LEWIS C. GALLEHER
BY
ATTORNEYS

Aug. 18, 1936.                L. C. GALLEHER                2,051,137
                              HYDRAULIC VALVE
                            Filed July 17, 1933            4 Sheets-Sheet 3
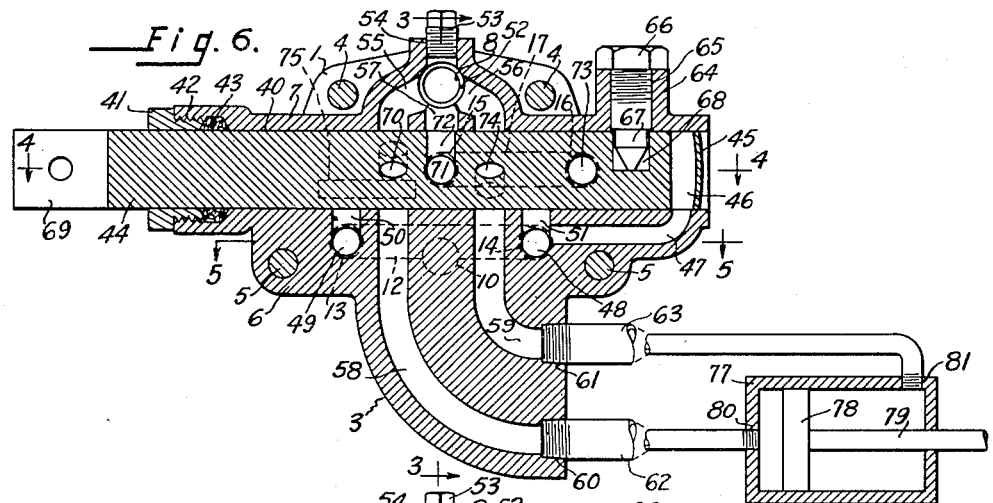
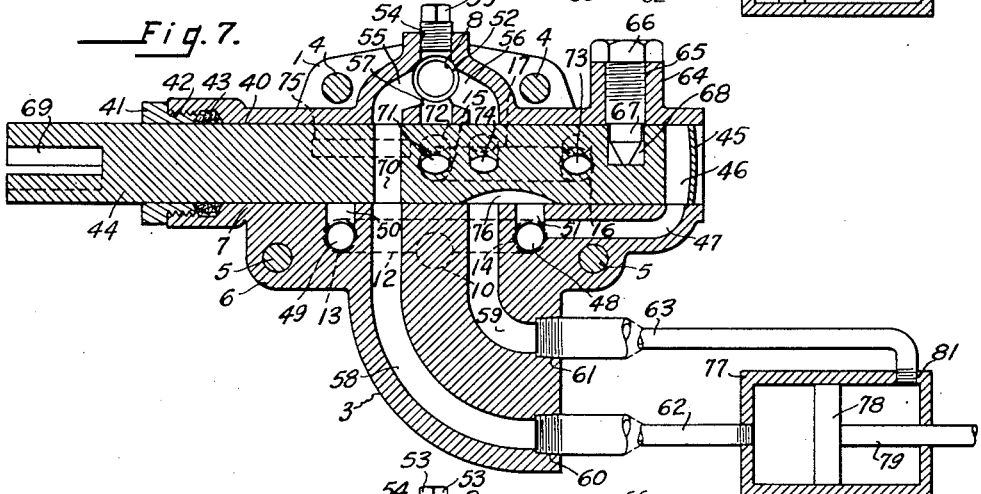
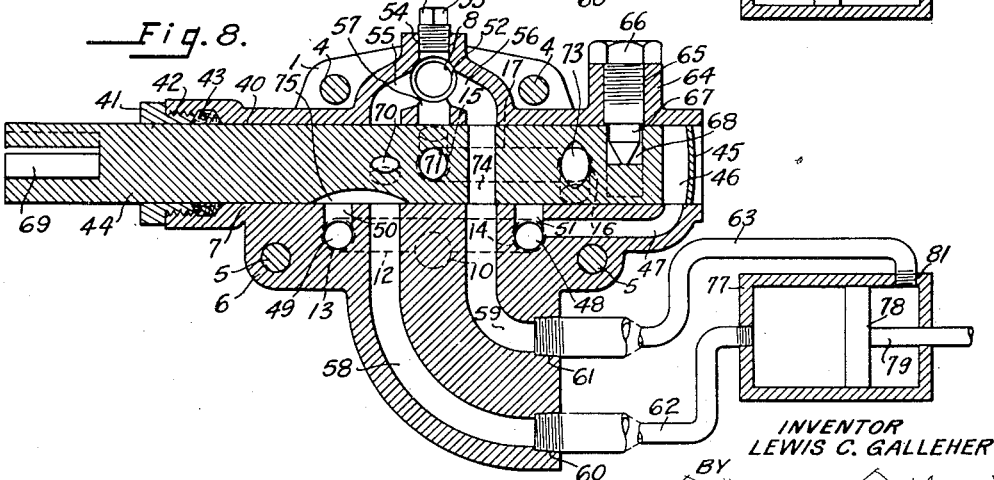
INVENTOR
LEWIS C. GALLEHER
BY
ATTORNEYS Aug. 18, 1936.  L. C. GALLEHER  2,051,137
HYDRAULIC VALVE
Filed July 17, 1933  4 Sheets-Sheet 4
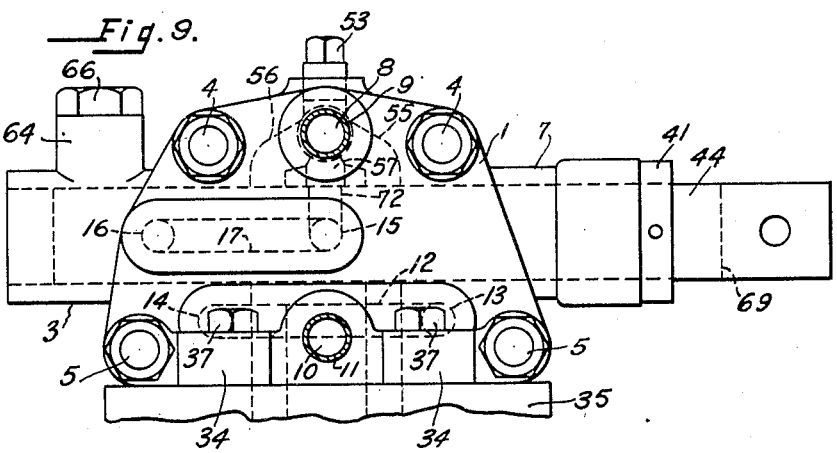
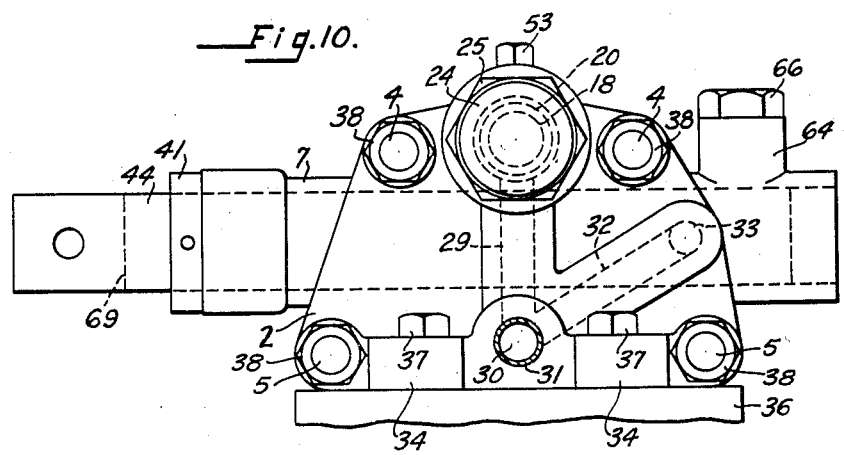
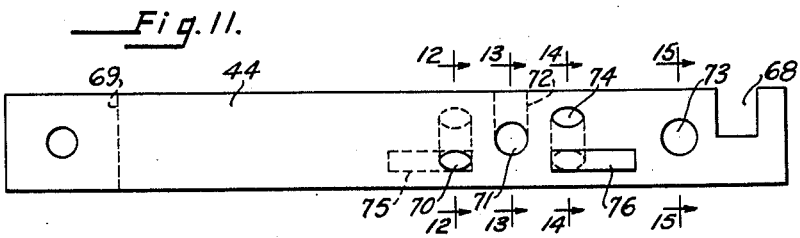
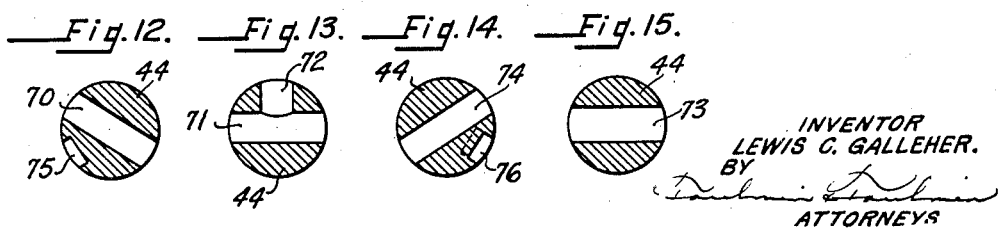
INVENTOR
LEWIS C. GALLEHER.
BY
ATTORNEYS Patented Aug. 18, 1936

2,051,137

UNITED STATES PATENT OFFICE 2,051,137

HYDRAULIC VALVE

Lewis C. Galleher, Marion, Ohio, assignor to The Huber Manufacturing Company, Marion, Ohio, a corporation of Ohio Application July 17, 1933, Serial No. 680,714

8 Claims. (Cl. 121—46.5)

This invention relates to valves and, in particular, to valves for controlling the flow of hydraulic pressure fluid to hydraulic machinery.

An object of my invention is to provide a hydraulic reversing valve unit having a rotary valve rod.

Another object is to provide a valve unit assembly including a plurality of such valve units assembled in any number desired, and held between end plates.

Another object is to provide such a valve unit assembly held between end plates having pressure and exhaust fluid connections common to all of the individual valve units, whatever their number may be.

Another object is to provide such a valve unit assembly wherein no pressure will be exerted upon the valve mechanism until that pressure is to be used in one of the valve units, the pump flow being otherwise by-passed.

Another object is to provide such a valve unit arranged to give a regulated return pressure.

Another object is to provide a valve unit for such a valve assembly having a rotatable valve rod with a plurality of cross bores and grooves therein, and a plurality of conduits in the valve unit casing, alternately communicating with said grooves and bores as selected by the turning of the valve rod.

Another object is to provide a plurality of valve units, each unit being similar to the other units, all of the units being assembled by tie bolts holding them in engagement to each other and to the end plates of the valve unit assembly.

In the drawings:

Figure 1 is a plan view of my valve unit assembly, showing the valve rods in their neutral positions.

Figure 2 is a side elevation of the valve unit assembly shown in Figure 1, with the valve rods likewise in a neutral position.

Figure 6 is a transverse cross section through the center of a valve rod along the line 6—6 of Figure 2, showing the valve rod in its neutral position.

Figure 7 is a view similar to Figure 6, but with the valve rod in its forward position.

Figure 8 is a view similar to Figure 6, but with the valve rod in its reverse position.

Figure 9 is a lefthand end elevation of the hydraulic valve assembly shown in Figure 1, partly broken away.

Figure 10 is a righthand end elevation thereof.

Figure 11 is a side elevation of the valve rod shown in cross section in Figure 6.

Figures 3, 4, 5:
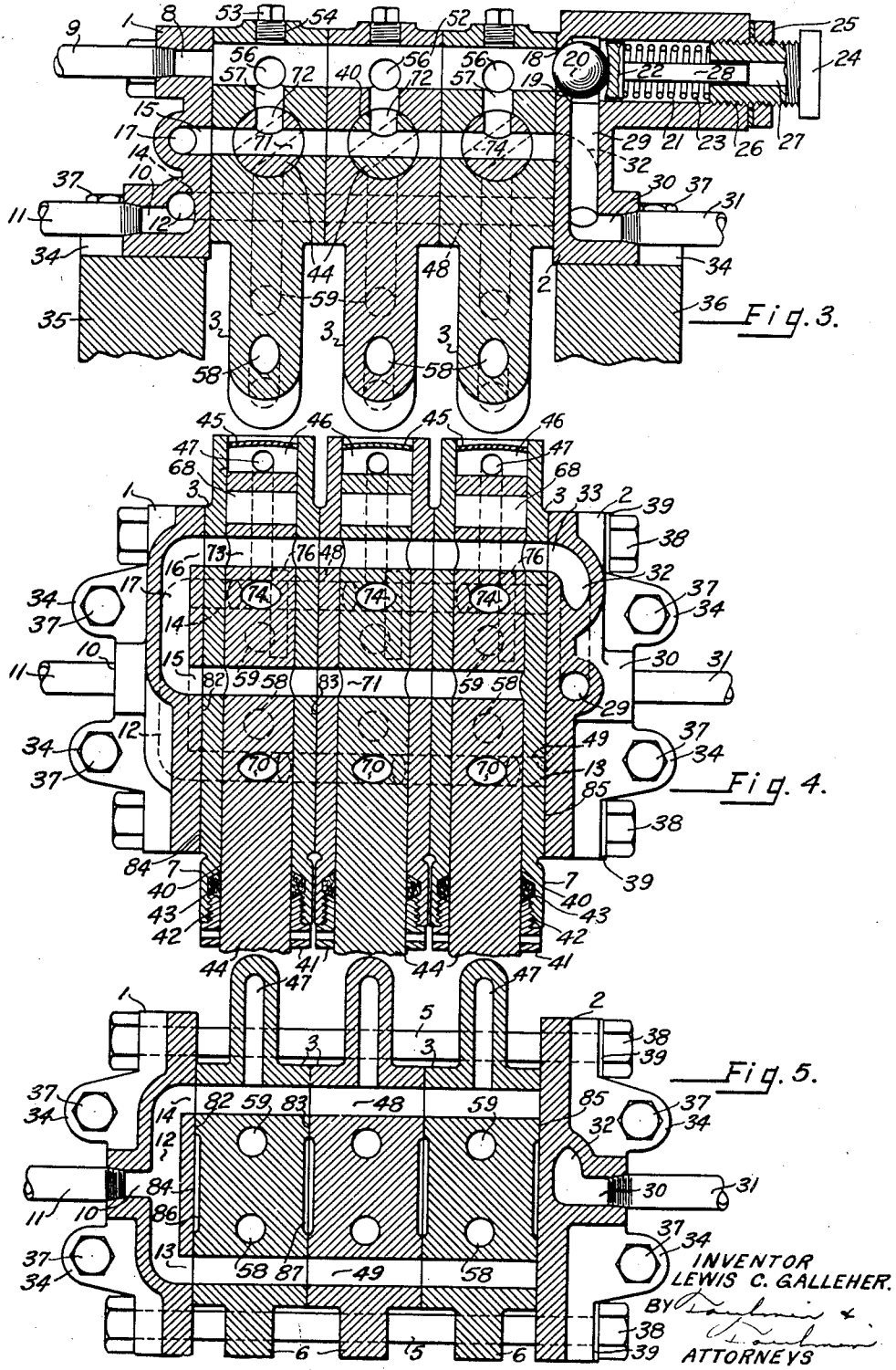
Figure 3 is a vertical longitudinal cross section along the line 3—3 of Figures 1 and 6.
Figure 4 is a horizontal longitudinal cross section along the line 4—4 of Figure 6.
Figure 5 is a horizontal longitudinal cross section along the line 5—5 of Figure 6.

Figures 12, 13, 14 and 15 are cross sections along the lines 12—12, 13—13, 14—14 and 15—15 respectively, of the valve shown in Figure 11.

General construction

Referring to the drawings in detail, Figures 1 and 2 show a valve unit assembly of my invention having end plates, generally designated 1 and 2, and individual valve units, generally designated 3. The valve units are assembled face to face as shown, and united to the end plates by the upper tie bolts 4 passing outside of the valve units, and the tie bolts 5 passing through the bored lugs 6 in the lower parts of the valve unit casings 7. (Figure 2).

The end plate 1 consists of a plate of metal having an upper intake port 8 connected to the pressure pipe 9 from the pressure side of the hudraulic pump in conjunction with which the valve is to be used. The lower central part of the end plate 1 contains a discharge port 10 connected to the discharge line 11 of the hydraulic circuit. The discharge port 10 is connected by a transverse passage 12 (Figure 5) to side ports 13 and 14, (Figure 5) these in turn being so positioned as to align with similar ports in the valve unit casings 7.

The middle portion of the end plate 1 contains a central port 15 and a side port 16 interconnected by the cross conduit 17 (Figures 4 and 9).

The ports 15 and 16 provide free communication between correspondingly aligned ports in the other valve units and valve rods only when the valve rods are in the neutral positions shown in Figure 4. The ports 8, 13 and 14, however, in the end plate 1 in assembly provide an unobstructed passage between the end plates 1 and 2 from one end of the valve unit assembly to the other, regardless of the number of valve units employed or the relative positions of their valve rods (Figure 4). In such an assembly, the conduit formed by the ports 13 and 14, valve unit passages aligned with them and the cross passage 12 in the end plate 1, is U-shaped (Figure 5). The end plate 2 does not contain a port aligned with the conduit formed by the superposed ports 13 or 14, these being closed by the unbroken face of the end plate 2.

The end plate 2 contains an upper central port 18 (Figure 3), having a spherical seat 19 which is engaged by the ball 20 of a ball relief valve operating in a bore 21 containing a push cap 22 urged forward by a coil spring 23. The latter engages a threaded plug 24 having a lock nut 25 to hold it in any desired position. The plug 24 engages the bore 21 in a threaded connection 26, and likewise contains a counterbore 27 adapted to loosely receive the push rod 28 secured to the push cap 22. The bore 21 and the port 18 open into a vertical conduit 29 which passes downward from beneath the ball (Figure 3) to a conduit by-pass 30 in the lower portion of the end plate 2. From the conduit 30, the by-pass pipe 31 threadedly connected therewith leads to the by-pass line of the hydraulic circuit.

The conduit 30 likewise communicates with a diagonal conduit 32 leading therefrom (Figures 3 and 4) to the side port 33 of the end plate 2. The side port 33 is aligned, through correspondingly situated bores in the valve unit casings and valve rods, with the side port 16 in the end plate 1 (Figure 4). Consequently, when the valve rods are in their neutral positions, as shown in Figure 4, the assembly of the ports and passages just mentioned forms a U-shaped conduit having an inclined extension formed by the diagonal conduit 32 in the end plate 2 (Figure 4).

The end plates 1 and 2 are provided with lugs 34 (Figure 5), whereby the valve unit assembly may be secured to any suitable foundation members 35 and 36, as by the bolts 37 (Figure 3). The tie bolts 4 and 5 clamp the end plates 1 and 2 and the individual valve units 3 tightly together (Figure 1) and are secured in this position by the nuts 38 and the lock washers 39.

Construction of individual valve units

The individual valve units, generally designated 3, are complete in themselves as regards their valve action, and are assembled face-to-face between the end plates 1 and 2, either singly or in any desired number (Figure 1). When so assembled they may be disassembled and re-assembled with a greater or lesser number of valve units merely by changing the length of the tie bolts 4 and 5.

Each individual valve unit 3 consists of a valve unit casing 7 containing a cylindrical bore 40 provided at one end with a gland 41 (Figure 6) having a threaded connection 42 therewith and functioning to compress a packing 43 to prevent the escape of liquid between it and the valve rod 44 passing therethrough. The opposite end of the cylindrical bore 40 contains a blowout head 45 adapted to hold itself in place under a normal fluid pressure in the valve, but to give way in case this pressure becomes dangerously high. The blowout head 45 has a blowout chamber 46 immediately between it and the end of the valve rod 44 and communicates by the blowout passage 47 with the valve casing discharge conduit 48 in the valve unit casing 7 (Figure 5). The valve casing discharge conduit 48 communicates with the port 14 in the end plate 1, and this in turn leads by the cross passage 12 to the port 13, which in turn communicates with corresponding valve casing discharge conduit 49 on the opposite side of the casing 7 from the valve casing discharge conduit 48. These discharge conduits 48 and 49 become aligned during assembly to provide a U-shaped conduit (Figure 5), having its arms closed at one end by the end plate 2 and opening at their opposite ends through the cross passage 12 into the discharge port 10 and the discharge pipe 11. The valve casing discharge conduits 48 and 49 are connected to the valve rod bore 40 by the ducts 50 and 51.

Above the valve rod 44 in the valve unit casing 7 is the valve casing inlet conduit 52 (Figure 3), a plurality of which in assembly forms a longitudinal passage communicating at one end with the intake port 8 in the end plate 1, and at the other end with the ball relief valve 20 in the end plate 2. Each of these conduits 52 has a plug 53 threaded into the threaded bore 54 above the valve casing intake passage 52. The latter communicates with three branch ducts 55, 56 and 57 leading downward therefrom into port-like outlets in the valve rod bore 40, beyond which the branches 55 and 56 continue onward in the J-shaped conduits 58 and 59 aligned therewith, respectively. The outer ends of the conduits 58 and 59 have the ports 60 and 61 threadedly engaging the pipes 62 and 63 leading to the hydraulic machinery which is to be controlled by the valve. On the opposite side of the valve unit casing 7 from the gland 41 (Figure 6) is the boss 64 having the threaded bore 65 adapted to receive the set screw 66, the end 67 of which engages a slot 68 milled through the end of the valve rod 44. Thus the set screw 66 cooperates with the slot 68 to allow a limited rotation of the valve rod 44, yet to prevent any endwise motion thereof. Thus the valve rod 44 is maintained in effective alignment with the various passages and conduits in the valve unit casing.

The valve rod 44 is cylindrical in form, and contains a plurality of passages and ports arranged in irregular locations. Nearest the slotted portion 69 of the forward end of the valve rod 44 is the passage 70. The latter is a plain drilled hole passing through the valve rod 44 and arranged to be aligned with the conduits 55 and 58 when the valve rod 44 is turned into a certain position (Figures 6 and 7). Farther back along the valve rod 44 is a similar drilled passage 71 (Figures 3 and 6), likewise passing completely through the valve rod 44. The passage 71, however, has its axis at an angle to that of the passage 70, and is provided with a cross duct 72 perpendicular thereto. When the valve rod 44 is rotated to a certain position, the passages 71 of the various valve rods become aligned with each other and with the port 15 in the end plate 1, whereas the cross duct 72 opens into communication with the duct 57 leading downward from the valve casing intake passage 52.

Near the rear end of the valve rod 44 adjacent to the milled slot 68 is a drilled passage 73 having its axis parallel to that of the passage 71. When all the valve rods are arranged in the same position, the passages 71 and 73 will align respectively with one another to form a continuous conduit (Figure 4), the passages 73 aligning with the port 16 in the end plate 1 and the passages 71 aligning with the port 15 therein, the two conduits thus formed being interconnected by the cross passage 17 in the end plate 1.

Situated between the passages 71 and 73 is a passage 74 similar in appearance to the passage 70, but arranged with its axis at an angle to the axes of the passages 70, 71 and 73. When the valve rod 44 is turned into a certain position (Figure 8), the passage 74 becomes aligned with the duct 56 and the conduit 59.

In addition to the bored passages 70, 71, 73 and 74, the valve rod 44 contains a pair of milled grooved passages 75 and 76 (Figure 7) but in a longitudinal direction, but spaced apart from one another around the circumference of the valve rod 44. The grooved passage 75 serves to interconnect the conduit 58 with the duct 50 (Figure 8) when the valve rod is turned in one position, whereas the grooved passage 76 serves to interconnect the conduit 59 with the duct 51 when the valve rod 44 is turned to another position (Figure 7). The rate of flow of fluid through the grooved passages 75 and 76 may be accurately regulated by controlling the size of the groove, and this size may be made such that the fluid being discharged will possess an appreciable lag behind the fluid pressure passing through the valve into the hydraulic machine.

Shown merely for illustrative purposes as symbolic of the hydraulic machine to be controlled by the valve is a cylinder 77 containing a piston head 78 attached to a piston rod 79. The pipe 62 communicates through the port 80 with the forward end of the cylinder 77, whereas the pipe 63 communicates with the rearward end thereof through the port 81 (Figures 6, 7 and 8). The side faces 82 and 83 of the valve casings 7 are accurately machined to a flat surface at the locations surrounding the various ports (Figure 5) so that they will accurately engage one another without danger of leakage when assembled face to face. The inward faces 84 and 85 of the end plates 1 and 2 are similarly machined to accurately flat surfaces for the same purpose (Figure 5). The valve unit casings 7 are relieved as at 86 and 87 at locations other than around the various ports (Figure 5), thus increasing the accuracy of engagement between the various valve units and end plates, and also lessening the danger of leakage in case of a slight warping of the castings.

*Operation of the valve units and valve unit assembly*

The valve unit 3 of my invention is adapted to give three different arrangements of control over a hydraulic pump and the hydraulic machine which the latter operates, namely the "neutral" (Figure 6), the "forward" (Figure 7) and the "reverse" (Figure 8) positions.

With the valve rod 44 set in the neutral position (Figures 1, 2, 3, 4 and 6), pressure fluid enters the valve unit assembly from the pump (not shown) by way of the intake pipe 9 (Figure 3) and intake port 8. The fluid continues through the valve casing intake passage 52 and the duct 57 into the cross duct 72 of the valve rod 44, thence through the passage 71 thereof through the port 15, the cross passage 17, the port 16, and back through the cross passages 73 (Figures 3 and 4) in the valve rods 44. After passing through the latter, the fluid continues through the port 33 in the end plate 2, thence downward through the diagonal conduit 32 and the passage 30 out through the by-pass pipe 31 to the discharge line of the hydraulic circuit. In this way the output of the pump is by-passed without exerting any pressure while the valve rods 44 are in their "neutral" positions.

In this position the passages 70 and 74 of the valve rod 44, as well as the grooved passages 75 and 76, are out of communication with the other passages or ports of the valve unit casing.

If the valve rod 44 is now turned clockwise into its "forward" position (Figure 7), the pressure fluid passes from the valve casing intake passage 52 downward along the branch duct 55 through the valve rod passage 70 now aligned therewith into the lower J-shaped conduit 58, and thence by way of the pipe 62 to the forward end of the cylinder 77, forcing the piston thereof to the right. The fluid behind the piston head 78 is discharged therefrom by way of the pipe 63 (Figure 7), the upper J-shaped conduit 59, the grooved passage 76, the duct 51, the valve casing conduit 48, the port 14 (Figure 5), the cross passage 12 in the end plate 1, the port 10 and the discharge pipe 11 leading to the discharge line of the hydraulic circuit. Thus a slight clockwise turning of the valve rod 44 causes the hydraulic pump to operate the hydraulic machine in a forward direction.

If now the valve rod 44 be turned in a counter-clockwise direction, the valve unit 3 is then arranged to operate the hydraulic machine in the reverse direction. The "reverse" position of the valve rod 44 (Figure 8) allows pressure fluid to flow from the intake passage 52 along the branch duct 56 through the valve rod passage 74 and the upper J-shaped conduit 59 along the pipe 63 into the rearward chamber of the cylinder 77. This causes the piston head 78 to move to the left. The fluid discharged from the forward chamber of the cylinder 77 passes outward through the pipe 62, the lower J-shaped conduit 58, the grooved valve rod passage 75, the duct 50, the valve casing discharge passage 49, the port 13 in the end plate 1, the cross passage 12, the discharge port 10 and the discharge pipe 11 leading to the discharge line of the hydraulic circuit. The other ports and passages in the valve rod remain disconnected from any communication with the other ports and passages in the valve unit casing 7.

Safety devices are provided against the action of dangerous pressures which might arise either in the intake line or the discharge line of the valve unit assembly. The safety device for the intake line (Figure 3) comprises the ball relief valve 20, previously described. If a pressure greater than the predetermined set pressure of this relief valve arises in the valve unit intake passage 52, the ball 20 is forced backward from its seat 19, opening communication through the port 18 into the vertical conduit 29. The pressure fluid then passes downward through the vertical conduit 29 and out into the discharge line of the hydraulic circuit by way of the conduit 30 and the discharge pipe 31. When the excess pressure is thus released without going through the valve, the spring 23 forces the ball 20 back against its seat 19, closing off the passage 29 from the valve unit discharge passage 52. (Figure 3).

The safety device in the discharge line comprises the blowout heads 45 arranged to close the end chamber 46 of each valve unit casing 7. This chamber 46 communicates with the discharge passage 48 through the passage 47 (Figure 6). Consequently, any dangerous pressure developing in the discharge passages 47 or 48 will cause the blowout head 45 to be pushed out of the end of the valve rod bore 40, releasing the excessive pressure fluid and protecting the valve from any danger. The blowout head 45 may be replaced at a very low cost and the valve is again ready for use.

It will be understood that I desire to comprehend within my invention such modifications as may be necessary to adapt it to varying conditions and uses.

Having thus fully described my invention, what

I claim as new and desire to secure by Letters Patent is:

1. An article of manufacture for use as a valve member in a hydraulic valve comprising a solid elongated body having a central transverse passage and an end transverse passage on either side thereof, said central transverse passage being adapted to cross-connect oppositely disposed casing ports registrable therewith, said transverse passages having their axes arranged at angles to one another, and a longitudinal groove extending endwards from the transverse axial plane of each end passage, said longitudinal grooves being spaced apart from one another longitudinally, said transverse end passages and longitudinal passages being arranged to cause the casing ports aligned with said transverse passages to be selectively connected transversely through said transverse passages to oppositely disposed casing ports or longitudinally through said longitudinal grooves to other casing ports spaced longitudinally from said first-mentioned casing ports.

2. An article of manufacture for use as a valve member in a hydraulic valve comprising a solid elongated body having a central transverse passage and an end transverse passage on either side thereof, said central transverse passage being adapted to cross-connect oppositely disposed casing ports registrable therewith, said transverse passages having their axes arranged at angles to one another, and a longitudinal groove extending endwards from the transverse axial plane of each end passage, said longitudinal grooves being spaced apart from one another longitudinally, one of said transverse passages having a transverse branch passage perpendicular thereto and adapted to form therewith a T-shaped central passage, said transverse end passages and longitudinal passages being arranged to cause the casing ports aligned with said transverse passages to be selectively connected transversely through said transverse passages to oppositely disposed casing ports or longitudinally through said longitudinal grooves to other casing ports spaced longitudinally from said first-mentioned casing ports.

3. A hydraulic valve comprising a casing having a valve bore, and a valve member rotatable therein, said valve member having a central transverse passage and an end transverse passage on either side thereof, said central transverse passage being adapted to cross-connect oppositely disposed casing ports registrable therewith, said transverse passages having their axes arranged at angles to one another, said valve member having a longitudinal groove extending endwards from the transverse axial plane of each passage, said longitudinal grooves being spaced apart from one another longitudinally, said casing having ports arranged on opposite sides of said valve bore for intercommunication selectively through said transverse and longitudinal passages.

4. A hydraulic valve comprising a casing having a valve bore, and a valve member rotatable therein, said valve member having a central transverse passage and an end transverse passage on either side thereof, said central transverse passage being adapted to cross-connect opposite disposed casing ports registrable therewith, said transverse passages having their axes arranged at angles to one another, said valve member having a longitudinal groove extending endwards from the transverse axial plane of each end passage, said longitudinal grooves being spaced apart from one another longitudinally, said casing having a pair of ports on one side of said valve bore aligned with a pair of ports on the opposite side for communication therewith through said transverse passages, and an additional pair of ports on one side spaced apart from the aligned ports on that side and arranged to communicate therewith through said longitudinal grooves.

5. A hydraulic valve comprising a casing having a valve bore, and a valve member rotatable therein, said valve member having a central transverse passage and an end transverse passage on either side thereof, said central transverse passage being adapted to cross-connect oppositely disposed casing ports registrable therewith, said transverse passages having their axes arranged at angles to one another, said valve member having a longitudinal groove extending endwards from the transverse axial plane of each end passage, said longitudinal grooves being spaced apart from one another longitudinally, said casing having a pair of ports on one side of said valve bore aligned with a pair of ports on the opposite side of said valve bore, and an additional pair of ports on one side arranged to communicate with one pair of said aligned ports through said longitudinal grooves to selectively communicate one at a time, one port of said aligned pair being adapted to communicate with the opposite aligned port through one transverse passage of said valve member while another of said aligned ports is connected to one of said additional ports through one of said longitudinal grooves.

6. A hydraulic valve comprising a casing having a valve bore, and a valve member rotatable therein, said valve member having a central transverse passage and an end transverse passage on either side thereof, said central transverse passage being adapted to cross-connect oppositely disposed casing ports registrable therewith, said transverse passages having their axes arranged at angles to one another, said valve member having a longitudinal groove extending endwards from the transverse axial plane of each end passage, said casing having three interconnected ports on one side of said valve bore and two ports on the opposite side in alignment with two of said interconnected ports and arranged to communicate therewith one at a time through said transverse valve passages as the valve rod is rotated.

7. A hydraulic valve comprising a casing having a valve bore and a valve rod rotatable therein; said valve rod having a central transverse passage, an angularly rotated transverse passage on either side thereof, and a fourth transverse passage therebeyond; said valve rod having a longitudinal groove extending endwards from the plane of each of the two transverse passages adjacent the central passage; said casing having an intake conduit on one side of said valve bore, two machine-operating conduits on the opposite side in alignment therewith, a by-pass conduit in alignment with said central and fourth transverse passage, and a discharge conduit; said casing conduits and valve rod passages being so arranged that in one position of the valve rod the intake passage is connected through said central valve passage and said fourth valve passage to said by-pass conduit, in a second position thereof the intake passage is connected through the valve rod to the first machine-operating conduit while the second machine-operating conduit is connected through one of said longitudinal grooves to said discharge conduit, and in a third position the intake passage is connected through the valve rod to the second machine-operating conduit while the first machine-operating conduit is connected through the other of said longitudinal grooves to said discharge conduit.

8. A hydraulic valve comprising a casing having a valve bore and a valve rod rotatable therein; said valve rod having a central transverse passage, an angularly rotated transverse passage on either side thereof, and a fourth transverse passage therebeyond; said valve rod having a longitudinal groove extending endwards from the plane of each of the two transverse passages adjacent the central passage; said casing having an intake conduit on one side of said valve bore, two machine-operating conduits on the opposite side in alignment therewith, a by-pass conduit in alignment with said central and fourth transverse passage, and a discharge conduit; said casing conduits and valve rod passages being so arranged that in one position of the valve rod the intake passage is connected through said central valve passage and said fourth valve passage to said by-pass conduit, in a second position thereof the intake passage is connected through the valve rod to the first machine-operating conduit while the second machine-operating conduit is connected through one of said longitudinal grooves to said discharge conduit, and in a third position the intake passage is connected through the valve rod to the second machine-operating conduit while the first machine-operating conduit is connected through the other of said longitudinal grooves to said discharge conduit, and an end plate on either side of said casing; one of said end plates having an intake conduit, a discharge conduit and a by-pass conduit, respectively, in alignment with the corresponding intake, discharge and by-pass conduits in said casing, whereby to permit the assembly of a plurality of casings in alignment between said end plates.

LEWIS C. GALLEHER.